(12) United States Patent
Patel et al.

(10) Patent No.: US 8,514,062 B2
(45) Date of Patent: Aug. 20, 2013

(54) METHOD FOR LEARNING AND SETTING WARM PLACARD PRESSURE THRESHOLD FOR A DIRECT TIRE PRESSURE MONITORING SYSTEM

(75) Inventors: Dilip B. Patel, Novi, MI (US); Greg Swadling, Milford, MI (US); Thomas Michael McQuade, Ann Arbor, MI (US); Jim Michael Weinfurther, Farmington, MI (US)

(73) Assignee: Ford Global Technologies, Dearborn, MI (US)

( * ) Notice: Subject to any disclaimer, the term of this patent is extended or adjusted under 35 U.S.C. 154(b) by 356 days.

(21) Appl. No.: 12/833,361

(22) Filed: Jul. 9, 2010

(65) Prior Publication Data

US 2012/0007729 A1    Jan. 12, 2012

(51) Int. Cl.
*B60C 23/00* (2006.01)
(52) U.S. Cl.
USPC .................. 340/442; 340/444; 340/438
(58) Field of Classification Search
USPC ............ 340/442, 438, 445, 441, 444, 426.33, 340/447–449, 466
See application file for complete search history.

(56) References Cited

U.S. PATENT DOCUMENTS

| | | | |
|---|---|---|---|
| 5,764,137 A * | 6/1998 | Zarkhin | 340/444 |
| 6,591,671 B2 | 7/2003 | Brown | |
| 6,810,727 B1 | 11/2004 | Davis et al. | |
| 6,877,371 B1 | 4/2005 | Walenty et al. | |
| 7,002,455 B2 * | 2/2006 | Buck et al. | 340/442 |
| 7,092,804 B2 * | 8/2006 | McQuade et al. | 701/32.9 |
| 7,224,267 B1 * | 5/2007 | Ellis | 340/442 |
| 7,323,975 B2 | 1/2008 | Hall et al. | |
| 7,331,220 B2 | 2/2008 | Lauer et al. | |
| 7,398,668 B2 * | 7/2008 | Nordmeyer | 73/1.13 |
| 7,483,794 B2 | 1/2009 | Bocquillon et al. | |
| 2006/0010961 A1 * | 1/2006 | Gibson et al. | 73/40 |
| 2006/0220813 A1 * | 10/2006 | Utter et al. | 340/442 |
| 2008/0061625 A1 | 3/2008 | Schmitt et al. | |
| 2010/0013618 A1 | 1/2010 | Patel et al. | |
| 2010/0148949 A1 | 6/2010 | McQuade et al. | |

* cited by examiner

*Primary Examiner* — Daniel Previl
(74) *Attorney, Agent, or Firm* — Angela M. Brunetti; Raymond Coppiellie

(57) ABSTRACT

A method for setting a warm placard tire pressure threshold for a motor vehicle tire pressure monitoring system that initiates a learn mode in the tire pressure monitoring system, starts a timer upon determining a vehicle speed is greater than a predetermined speed threshold, stops the timer upon determining the vehicle speed is less than or equal to the predetermined speed threshold or a predetermined period of time has expired, detects a plurality of tire pressures for a tire location while the timer is timing, stores the plurality of tire pressures, averages the plurality of tire pressures to determine a warm placard tire pressure threshold upon the predetermined period of time expiring, and sets the warm placard tire pressure threshold in the tire pressure monitoring system.

11 Claims, 3 Drawing Sheets

METHOD FOR LEARNING AND SETTING WARM PLACARD PRESSURE THRESHOLD FOR A DIRECT TIRE PRESSURE MONITORING SYSTEM

TECHNICAL FIELD

The inventive subject matter relates generally to a direct tire pressure monitoring system and more particularly to determining warm placard pressure in a direct tire pressure monitoring system.

BACKGROUND

A tire pressure monitoring system (TPMS) is an electronic system that monitors the air pressure of tires on a vehicle. Such systems generate a pressure signal using an electromagnetic (EM) radio frequency (RF) signal, which is transmitted to a receiver and corresponds to a pressure within the tire. When the tire pressure drops below a threshold pressure, an indicator is used to signal the vehicle operator of the low pressure. The vehicle operator can remedy the problem by filling the low tire to increase the pressure therein. A direct tire pressure monitoring system (TPMS) uses pressure sensors that are directly mounted to the wheels or tires of the vehicle.

Direct TPMS typically relies on a cold inflation pressure threshold, which is the inflation pressure of the tires before the car is driven and the tires warm-up, and is typically a setting recommended in the vehicle owner's manual. Recently however, some markets require that under-inflation warning thresholds be based upon in-service tire pressure, also known as warm placard tire pressure. Tire pressures recommendations are provided by motor vehicle manufacturers in the form of placards. In-service tire pressure is referred to as warm placard pressure and is defined as the tire pressure after the tire temperature has reached a steady-state condition. This steady-state condition typically occurs after the vehicle has been traveling above a threshold speed for a predetermined amount of time, typically twenty minutes of driving.

Determining the warm placard pressure can be difficult because it requires knowledge of an original pressure setpoint intended by the vehicle operator. Furthermore, ambient temperature influence on tire pressure may create variations in warm placard pressure within a given day and day to day. When ambient temperature decreases, tire pressure also decreases. When the tire is driven, the temperature increases, as does the tire pressure.

Other factors may also affect the threshold value for warm placard tire pressure. For example, vehicles in some markets also have additional variations in recommended pressure, such as pressure recommendations that are split between the front and rear tire locations, also known as split-placard or multiple placard pressures. Other variations may include recommendations for full vs. lightly loaded conditions and vehicle speed. In order to monitor such additional variations, the direct TPMS must determine the location of each sensor, which is typically accomplished by way of expensive and complex hardware.

There is a need for determining warm placard pressure for direct TPMS and in particular determining warm placard pressure for multiple placard pressure requirements.

SUMMARY

The present invention is a method for determining the warm placard pressure for a direct TPMS at each rolling tire location and setting a warm placard tire pressure threshold for the TPMS. The present invention is thereby able to allow the tire pressure monitoring system to detect low tire pressure based on warm placard pressure threshold setting even for multiple placard situations without the complexities associated with existing methods that require expensive and complex hardware.

The present invention is advantageous in that the TPMS of the inventive subject matter indicates a low tire pressure based on warm placard pressure in situations when the customer adjusts or changes placard pressure. A further advantage from determining the warm placard tire pressure at each tire location is that the inventive subject matter is able to monitor split-placard tire pressures without added hardware or complexity to the TPMS.

A method for setting a warm placard tire pressure threshold for a motor vehicle tire pressure monitoring system that initiates a learn mode in the tire pressure monitoring system, starts a timer upon determining a vehicle speed is greater than a predetermined speed threshold, stops the timer upon determining the vehicle speed is less than or equal to the predetermined speed threshold or a predetermined period of time has expired, detects a plurality of tire pressures for a tire location while the timer is timing, stores the plurality of tire pressures, averages the plurality of tire pressures to determine a warm placard tire pressure threshold upon the predetermined period of time expiring, and sets the warm placard tire pressure threshold in the tire pressure monitoring system.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
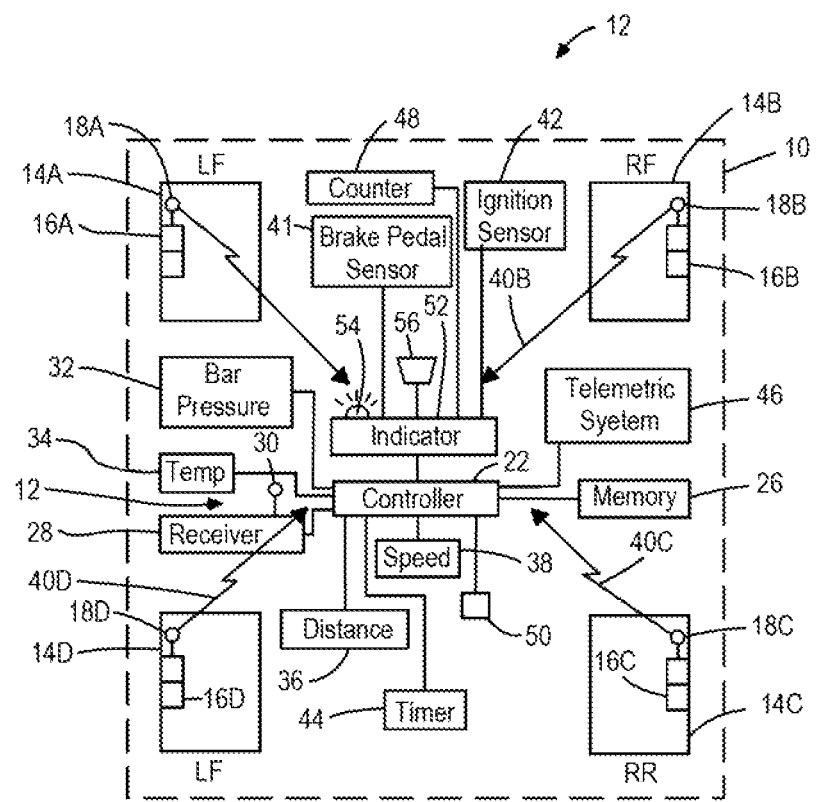
FIG. 1 is a block diagram of a direct tire pressure monitoring system of the inventive subject matter.

FIG. 1 shows a tire pressure monitoring system 12 for monitoring the air pressure within a left front tire 14A, a right front tire 14B, a right rear tire 14C and a left rear tire 14D. Each tire 14A-14D has a respective tire pressure sensor circuit 16A, 16B, 16C, and 16D. Each sensor circuit 16A-16D has a respective antenna 18A, 18B, 18C and 18D. Each tire is positioned upon a corresponding wheel of a vehicle. While four tires are illustrated herein, it should be noted that the number of tires may be increased as necessary depending on the vehicle. For example, a spare tire may also be included on the vehicle and may be equipped with a pressure sensor circuit as well as an antenna. Another example is a truck having dual wheels at one or several locations that may have more tires than described in the present example.

Controller 22 has a memory 26 associated therewith. Memory 26 may be various types of memory including but not limited to ROM or RAM. Memory 26 is illustrated as a separate component. However, those skilled in the art will recognize controller 22 may have memory 26 incorporated therein. Memory 26 stores various thresholds, calibrations, tire characteristics, wheel characteristics, serial numbers, conversion factors, temperature probes, spare tire operating parameters, and other values needed in the calculation, calibration and operation of the tire pressure monitoring system 12. For example, memory 26 may contain a pareto that includes the sensor identification thereof. Also, any warning statuses of each of the tires may be stored within the memory 26.

Controller 22 is coupled to a receiver 28, which, like memory 26, may also be incorporated into the controller 22. Receiver 28 has an antenna 30 associated therewith. Receiver 30 receives pressure and various information from tire pressure circuits 16A-16E. Controller 22 is also coupled to a plurality of sensors, including but not limited to, barometric pressure sensor 32, an ambient temperature sensor 34, a distance sensor 36, a speed sensor 38, a brake pedal sensor 41, and an ignition sensor 42. Controller 22 may also be coupled to a button 50, or a plurality of buttons 50 for inputting information, resetting the controller, or other functions that will be evident to those skilled in the art through the following description. After maintenance is performed, an operator or dealer service will reset the TPMS in order to learn the new warm placard pressure values. The method may vary based on the vehicle. The reset may include a dedicated TPMS reset button, or a TPMS reset menu screen in a cluster message center.

Ignition sensor 42 may be one of a variety of types of sensors to determine if the ignition is powered on. When the ignition is on, a run signal may be generated. When the ignition is off, an off signal may be generated. A simple ignition switch may act as an ignition sensor 42. Of course, sensing the voltage on a particular control line may also provide an indication of whether the ignition is activated.

A timer 44 may be used to measure various times associated with the process set forth herein. The timer 44, for example, may measure the time the vehicle is traveling above a predetermined threshold speed value. A telemetric system 46 may be used to communicate information to and from a central location on a vehicle. For example, the control location may keep track of service intervals and use information to inform the vehicle operator service is required. A counter 48 may also be included in the control system. Counter 48 may count the number of times a particular action is performed. For example, counter 48 may be used to count the number of times pressure measurements are stored in memory.

Controller 22 may also be coupled to an indicator 52. Indicator 52 may include an indicator light or display panel 54 which generates a visual signal or an audible device 56 such as a speaker or buzzer that generates an audible signal. Indicator 52 may provide some indication as to the operability of the system such as confirming receipt of a signal such as a calibration signal or other commands, warnings, and controls as will be discussed hereinafter. Indicator 52 may be an LED or LCD panel used to provide commands to the vehicle operator when manual calibrations are performed.

Figure 2:
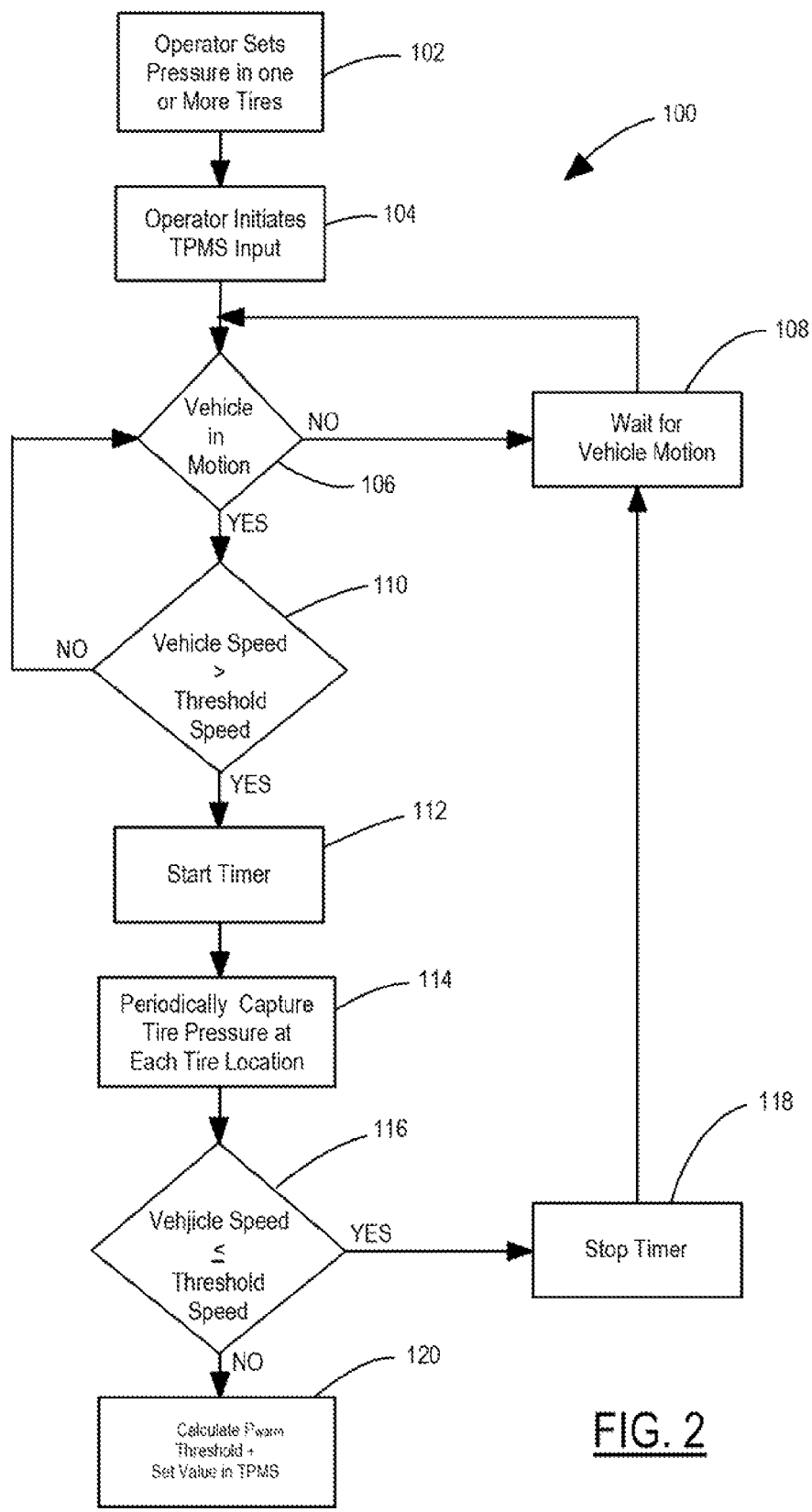
FIG. 2 is a functional flow chart of a direct tire pressure monitoring system of the inventive subject matter.

FIG. 2 shows a flow chart 100 of the inventive subject matter. The method of the present invention determines a warm placard tire pressure value by monitoring a tire pressure at each rolling tire location upon initiation of a status change by the vehicle operator and then sets a warm placard tire pressure threshold level to be used by the TPMS for each rolling tire location. When the vehicle operator sets 102 the tire pressure in one or more tires to a recommended level for a particular vehicle usage condition, the operator initiates 104 an input, as by a dedicated switch or other human/machine interface device, that is received by the TPMS, thereby initiating a warm placard tire pressure learn mode.

Warm placard pressure is typically achieved after about twenty minutes of driving, so once the learn mode is initiated by the operator decision block 106 inquires whether the vehicle is in motion. If the result of the inquiry 106 is that the vehicle is not in motion, then the method waits 108 for vehicle motion. If the result of the inquiry 106 is that the vehicle is in motion, decision block 110 inquires whether the vehicle speed is greater than a predetermined vehicle speed threshold.

In the event the vehicle speed is not greater than the threshold, the system returns to decision block 106. In the event the response to the inquiry is that the vehicle speed is greater than the threshold, the timer begins timing 106. While the timer is timing and the vehicle speed is greater than the predetermined threshold, the system periodically captures 114 the tire pressure at each tire location and stores the values for each tire location in memory. Inquiry block 116 inquires whether the vehicle speed drops below or equal to the vehicle speed threshold value. In the event the response to the inquiry is no, the inquiry block 116 inquires whether the vehicle speed meets or drops below the vehicle speed threshold value. In the event the response to the inquiry is yes, the timer stops timing 118. While the timer has begun timing and the vehicle speed remains above the threshold value, the method periodically captures the tire pressure at each tire location and uses the captured pressure values to calculate 120 a warm placard tire pressure threshold value that is to be used by the TPMS system for monitoring tire pressure.

Figure 3:
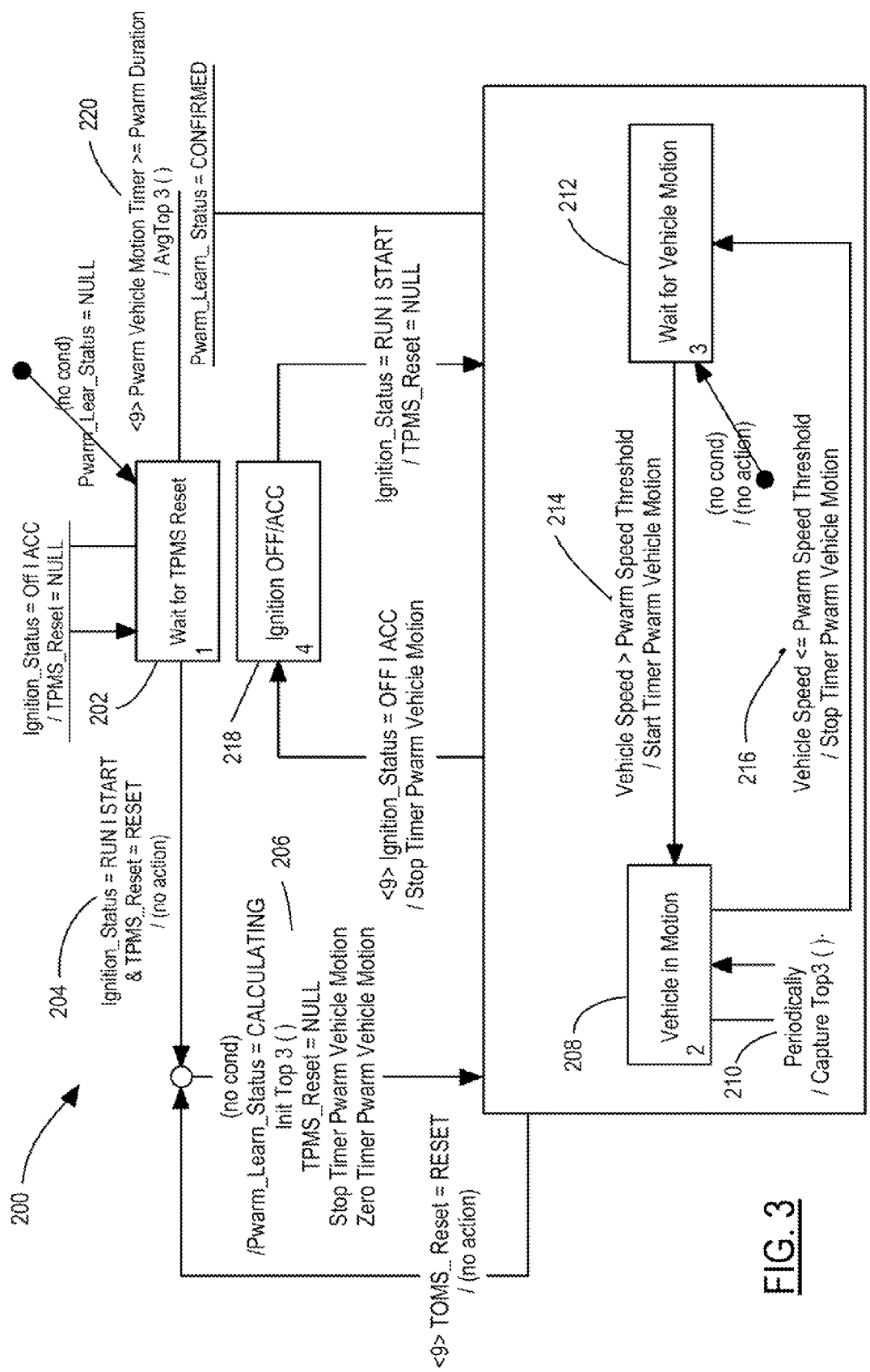
FIG. 3 is a state diagram of the warm placard tire pressure monitoring system of the inventive subject matter.

FIG. 3 is a state diagram 200 for the system that is applied to each tire location in order to learn and set the warm placard pressure threshold for the TPMS. The system and method of the present invention determines the warm placard pressure for each tire based on pressure data received from each of the tire pressure sensors in the rolling wheels. The under-inflation warning threshold to be used by the TPMS is determined from the warm placard pressure. Because a unique warm placard pressure is determined for each rolling tire location, the system and method of the present invention are not affected by the complexities normally associated with split placard, load and speed variations.

Referring still to FIG. 3, a state diagram 200 for a single tire location is shown. The state diagram is applicable to each tire location and will be discussed hereinafter. The method of learning the warm placard tire pressure begins when the TPMS receives the input from the vehicle operator that indicates the operator has adjusted the tire pressure settings resulting in the need for a new warm placard tire pressure threshold value to be determined. The method waits 202 for the signal indicating the learn mode is to begin. When the ignition status reads start and the learn mode input has been received 204, the learn status is initiated and the method of the present invention begins 206 calculating the warm placard tire pressure threshold value.

The vehicle must be in motion 208 when the TPMS captures the tire pressure reading at the rolling tire location of interest. In a preferred embodiment, a plurality of pressure readings are taken, and the top three pressure readings for the tire location of interest are stored for use in calculating the warm placard tire pressure threshold value for that particular tire location. Because the warm placard tire pressure is based on the tire pressure for a tire that is in use, the method waits 212 for vehicle motion. Once the vehicle is in motion and traveling at a speed above the predetermined speed threshold value, a timer begins timing and the method begins periodically capturing tire pressures. In the event the vehicle stops or drops below a predetermined speed threshold, the timer is stopped and the method waits 212.

If at any time the ignition status returns to "OFF", the timer is stopped 218. Once the vehicle has been in motion above the speed threshold value for a predetermined amount of time, a plurality of stored pressure readings are averaged 220. In the embodiment shown in FIG. 3, the top three pressure readings are averaged 220. However, one skilled in the art is capable of modifying the number of pressure readings used in the average without departing from the scope of the present invention.

The average of the pressure readings is then used to set a warm placard tire pressure threshold value for that particular tire location. The newly learned warm placard tire pressure threshold value is then used by the TPMS when monitoring tire pressure and warning an operator of tire pressure issues.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A method for setting a tire pressure threshold for a motor vehicle tire pressure monitoring system, comprising the steps of:
    initiating a learn mode;
    starting a timer when a vehicle speed is greater than a predetermined speed threshold;
    stopping a timer when the vehicle speed is less than or equal to the predetermined speed threshold or a predetermined period of time has expired;
    detecting a plurality of tire pressures for a tire location while the timer is timing;
    storing the plurality of tire pressures for a tire location;
    calculating a tire pressure threshold from the plurality of tire pressures upon the predetermined period of time expiring; and
    setting the tire pressure threshold for the tire in the tire pressure monitoring system.

2. The method of claim 1, wherein the step of calculating comprises averaging the plurality of tire pressures.

3. The method of claim 2, wherein the step of calculating further comprises averaging a predetermined number of tire pressures from the plurality of tire pressures.

4. The method of claim 3, wherein the step of calculating further comprises averaging the top three tire pressures from the plurality of tire pressures.

5. The method of claim 1, wherein the step of detecting further comprises detecting tire pressures for a tire location at predetermined periodic time intervals.

6. The method of claim 1, wherein the steps of detecting, storing, calculating and setting further comprise individually detecting, storing, calculating and setting for each tire location on the motor vehicle, whereby each tire location is assigned a respective tire pressure threshold value to be used by the tire pressure monitoring system.

7. A method for setting a warm placard tire pressure threshold for a motor vehicle tire pressure monitoring system, comprising the steps of:
    initiating a learn mode in the tire pressure monitoring system;
    starting a timer upon determining a vehicle speed is greater than a predetermined speed threshold;
    stopping the tinier upon determining the vehicle speed is less than or equal to the predetermined speed threshold or a predetermined period of time has expired;
    detecting a plurality of tire pressures for a tire location while the timer is timing;
    storing, the plurality of tire pressures;
    averaging the plurality of tire pressures to determine a warm placard tire pressure threshold upon the predetermined period of time expiring; and
    setting the warm placard tire pressure threshold in the tire pressure monitoring system.

8. The method of claim 7, wherein the steps of detecting and storing a plurality of tire pressures further comprise individually detecting and storing a plurality of tire pressures for each tire location.

9. The method of claim 8, wherein the step of averaging the plurality of tire pressures to determine a warm placard tire pressure threshold further comprises individually averaging the plurality of tire pressures for each tire location.

10. The method of claim 9, wherein the step of setting the warm placard tire pressure threshold in the tire pressure monitoring system further comprises individually setting a warm placard tire pressure threshold for each tire location.

11. The method of claim 7, wherein the step of initiating a learn mode further comprises manually initiating a learn mode.

\* \* \* \* \*